(12) United States Patent
Hashida (10) Patent No.: US 9,205,368 B2
(45) Date of Patent: Dec. 8, 2015

(54) GAS ADSORBING DEVICE AND HOLLOW BODY HOUSING THE SAME

(71) Applicant: Panasonic Corporation, Kadoma-shi, Osaka (JP)

(72) Inventor: Masamichi Hashida, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/386,639

(22) PCT Filed: Mar. 21, 2013

(86) PCT No.: PCT/JP2013/001923
§ 371 (c)(1),
(2) Date: Sep. 19, 2014

(87) PCT Pub. No.: WO2013/140805
PCT Pub. Date: Sep. 26, 2013

(65) Prior Publication Data
US 2015/0068401 A1     Mar. 12, 2015

(30) Foreign Application Priority Data
Mar. 21, 2012  (JP) .................................. 2012-063012

(51) Int. Cl.
*B01D 53/04*  (2006.01)

(52) U.S. Cl.
CPC ........ *B01D 53/0407* (2013.01); *B01D 2257/80* (2013.01)

(58) Field of Classification Search
CPC ........................ B01D 2257/80; B01D 53/0407
See application file for complete search history.

(56) References Cited

U.S. PATENT DOCUMENTS

| | | | | |
|---|---|---|---|---|
| 2,994,404 | A | * | 8/1961 | Schifferly .................... 96/117.5 |
| 5,885,682 | A | * | 3/1999 | Tanimoto et al. ............... 428/69 |
| 6,428,612 | B1 | * | 8/2002 | McPhilmy et al. ............ 96/132 |
| 6,938,968 | B2 | * | 9/2005 | Tanimoto et al. ............ 312/406 |
| 2005/0175809 | A1 | * | 8/2005 | Hirai et al. ...................... 428/69 |
| 2009/0007789 | A1 | * | 1/2009 | Hirai et al. ...................... 96/153 |
| 2013/0306655 | A1 | * | 11/2013 | Takushima et al. ...... 220/592.25 |

FOREIGN PATENT DOCUMENTS

| | | |
|---|---|---|
| JP | 57-11976 U | 1/1982 |
| JP | 7-3720 U | 1/1995 |
| JP | 9-512088 | 12/1997 |
| JP | 2006-125600 | 5/2006 |

(Continued)

*Primary Examiner* — Christopher P Jones
(74) *Attorney, Agent, or Firm* — Hamre, Schumann, Mueller & Larson, P.C.

(57) ABSTRACT

Provided is a gas adsorbing device that allows a gas adsorbent to sufficiently exert its gas adsorption capacity even if the gas adsorbent absorbs a gas that contains moisture.

A gas adsorbing device (1) includes: a gas adsorbing member (2) including a container (5) with an opening, a gas adsorbent (6) housed in the container (5), and a sealing member (7) sealing the opening; a moisture adsorbent (3); and an outer package (4) whose inside is decompressed, the outer package (4) housing the gas adsorbing member (2) and the moisture adsorbent (3). The gas adsorbing member (2) and the moisture adsorbent (3) are arranged inside the outer package (4), such that an end portion of the gas adsorbing member (2) in its longitudinal direction and an end portion of the moisture adsorbent (3) in its longitudinal direction are adjacent to each other.

7 Claims, 5 Drawing Sheets (56) References Cited

FOREIGN PATENT DOCUMENTS

| JP | 2009-019695 | 1/2009 |
| JP | 2009-078261 | 4/2009 |
| JP | 2010-051915 | 3/2010 |
| WO | WO 96/01966 | 1/1996 |

* cited by examiner

GAS ADSORBING DEVICE AND HOLLOW BODY HOUSING THE SAME

TECHNICAL FIELD

The present invention relates to a gas adsorbing device capable of reducing degradation of a gas adsorbent in an environment where a gas to be adsorbed by the gas adsorbent contains moisture.

BACKGROUND ART

There has been a proposed gas adsorbing device capable of preventing degradation of a gas adsorbent due to moisture even in an environment where a gas to be adsorbed by the gas adsorbent contains moisture, which is more easily adsorbed to the gas adsorbent than the gas. The proposed gas adsorbing device is configured such that the gas adsorbent is covered with a moisture adsorbent, thereby preventing the degradation of the gas adsorbent due to moisture (see Patent Literature 1, for example).

Figure 5:
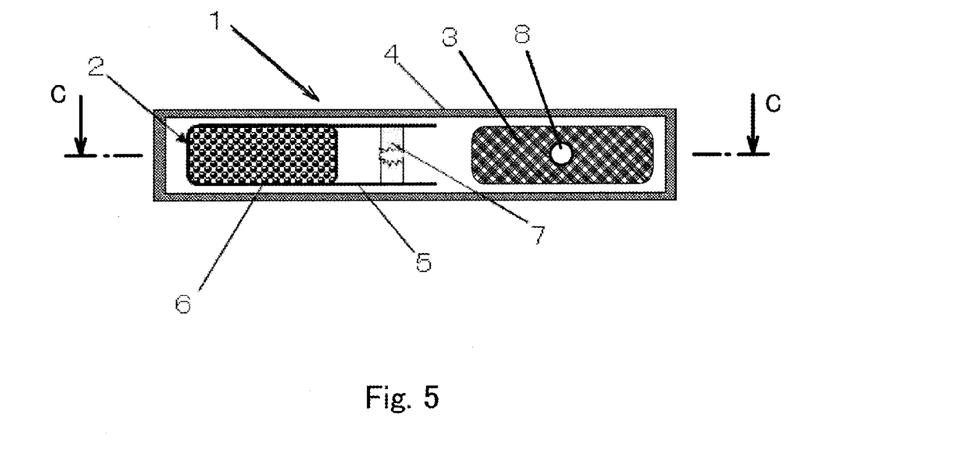
FIG. 5 is a schematic plan view of the gas adsorbing device in Embodiment 1 of the present invention after a through-hole has been formed in an outer package.

FIG. 5 is a schematic diagram showing the above conventional gas adsorbing device. As shown in FIG. 5, a gas adsorbing device 10 includes: an upper open container 11 formed of a gas-impermeable member, which is preferably aluminum; a getter (gas adsorbent) 13 placed at the bottom of the container; and a drying agent 15 housed in the upper part of the container such that the drying agent 15 fully covers a first pellet. In this configuration, a gas to be adsorbed needs to pass through the drying agent before reaching the getter. Therefore, even if the gas to be adsorbed contains moisture, the moisture is adsorbed by the drying agent, and only the gas in which the moisture has been reduced reaches the getter.

CITATION LIST

Patent Literature

PTL 1: Japanese National Phase PCT Laid-Open Publication No. H09-512088

SUMMARY OF INVENTION

Technical Problem

However, in the above conventional gas adsorbing device, the drying agent is disc-shaped in conformity with the shape of the upper open container, and the gas outside the device reaches the getter after passing through the drying agent. Therefore, if a passage in the drying agent through which the gas passes is short, the moisture of the gas may not be sufficiently removed. In order to lengthen the passage in the drying agent through which the gas passes, it is necessary to increase the amount of drying agent and increase the height of the upper open container. Consequently, if there are restrictions on the dimensions of the installation space of the gas adsorbing device, the application of the upper open container with such an increased height may be difficult.

Moreover, the above conventional gas adsorbing device is intended to be handled in the atmosphere when applied to its intended use. Here, if a time during which the gas adsorbing device is handled in the atmosphere becomes long, there is a risk that air that has passed through the drying agent and reached the getter is adsorbed, and thereby the gas adsorbing device degrades.

The present invention has been made to solve the above-described conventional problems. Even if the gas to be adsorbed contains moisture, the present invention sufficiently reduces the moisture in the gas and then allows the gas to reach the getter, thereby preventing degradation of the gas adsorbent due to moisture and allowing the getter to sufficiently exert its gas adsorption capacity.

In addition, the present invention provides a gas adsorbing device capable of preventing degradation of the gas adsorbent even if the gas adsorbing device is handled in the atmosphere for a long period time.

Solution to Problem

In order to achieve the above-described objects, a gas adsorbing device according to the present invention includes a gas adsorbing member, a moisture adsorbent, and an outer package. The gas adsorbing member and the moisture adsorbent are housed in the outer package, and the inside of the outer package is decompressed. The gas adsorbing member and the moisture adsorbent are arranged inside the outer package, such that an end portion of the gas adsorbing member in its longitudinal direction and an end portion of the moisture adsorbent in its longitudinal direction are adjacent to each other.

Accordingly, a gas that enters through a communication part passes the vicinity of the moisture adsorbent. Therefore, even if the gas contains moisture, the moisture is adsorbed by the moisture adsorbent, and the gas in which the moisture has been reduced reaches a gas adsorbent, which allows the gas adsorbent to exert its gas adsorption capacity effectively.

Advantageous Effects of Invention

The present invention allows a gas adsorbent to exert its gas adsorption capacity effectively, thereby making it possible to provide a gas adsorbing device with high adsorption capacity.

DESCRIPTION OF EMBODIMENTS

A gas adsorbing device according to a first aspect of the present invention includes: a gas adsorbing member including a container with an opening, a gas adsorbent housed in the container, and a sealing member sealing the opening; a moisture adsorbent; and an outer package whose inside is decompressed, the outer package housing the gas adsorbing member and the moisture adsorbent. The gas adsorbing member and the moisture adsorbent are arranged inside the outer package, such that an end portion of the gas adsorbing member in its longitudinal direction and an end portion of the moisture adsorbent in its longitudinal direction are adjacent to each other.

According to the above configuration, the gas adsorbing device becomes in a state of use when a communication part is formed in the outer package and the container of the gas adsorbing member such that the inside and the outside of each of these components come into communication with each other. In the state of use, the gas adsorbing member and the moisture adsorbent are arranged such that the end portion of the gas adsorbing member in its longitudinal direction and the end portion of the moisture adsorbent in its longitudinal direction are adjacent to each other. Therefore, a gas that enters the inside of the outer package can be caused to pass through the moisture adsorbent before reaching the gas adsorbing member. As a result, the gas adsorption capacity of the gas adsorbent can be exerted effectively. Moreover, the moisture adsorbent and the gas adsorbing member to be used can be made thin Consequently, the thickness of the thickest portion of the gas adsorbing device is the sum of: the thickness of the thickest portion of the gas adsorbing member and the moisture adsorbent; and the thickness of the outer package. Thus, the gas adsorbing device, which is made thin, can be provided. Furthermore, since the gas adsorbent is sealed inside the container, even if the gas adsorbing device is handled in the atmosphere for a long period time, the gas adsorbent will not degrade.

A second aspect of the present invention is such that, in the above first aspect, a communication part may be formed in the outer package at a portion that is in contact with the moisture adsorbent, the communication part allowing the inside of the outer package to be in communication with outside.

According to the above configuration, a gas that enters through the communication part first passes the vicinity of the moisture adsorbent. Therefore, even if the gas contains moisture, the moisture is adsorbed by the moisture adsorbent, and the gas in which the moisture has been reduced reaches the gas adsorbent. This allows the gas adsorbent to exert its gas adsorption capacity effectively. Thus, the gas adsorbing device, which has a high adsorption capacity, can be provided.

According to the above configuration, the container packed with the gas adsorbent, and also the moisture adsorbent, are housed in the outer package. In addition, the gas adsorbent is housed in the container. Accordingly, in order to cause the gas adsorbent to adsorb the gas outside the gas adsorbing device, the following steps are necessary: forming, for example, a through-hole in the outer package as the communication part, thereby introducing the gas to the inside of the outer package; and then, for example, forming a through-hole in the container, or destroying the sealing member, thereby introducing the gas inside the outer package into the container.

In these steps, when the through-hole serving as the communication part is formed in the outer package at a portion that is in contact with the moisture adsorbent, the gas outside the outer package is introduced to the inside of the outer package, and then immediately passes the vicinity of the moisture adsorbent, so that moisture in the gas is reduced. Thereafter, the gas reaches the gas adsorbing member.

Consequently, the gas in which the moisture has been reduced reaches the gas adsorbent. This allows the gas adsorbent to exert most of its gas adsorption capacity effectively. Thus, the gas adsorbing device, which has a high adsorption capacity, can be provided.

The gas adsorbing member and the moisture adsorbent are housed in the outer package, and the inside of the outer package is decompressed. This configuration makes it possible to provide the gas adsorbing device, in which the gas adsorbent does not degrade even if the gas adsorbing device is handled in the atmosphere for a long period of time.

A third aspect of the present invention is such that, in the above first or second aspect, the sealing member may be a brittle member.

According to the above configuration, since the sealing member is a brittle member, the sealing member can be destroyed by applying a stress from the outside of the outer package, and thereby a passage that allows a gas to flow from the outside of the container to the inside of the container can be readily formed.

Since the sealing member can be destroyed from the outside of the outer package, the sealing member can be destroyed at any desired timing after the container packed with the gas adsorbent is sealed inside the outer package, and thereby the gas can be introduced to the inside of the container.

A fourth aspect of the present invention is such that, in any one of the above first to third aspects, the moisture adsorbent may be housed in a packaging member having air permeability.

If the moisture adsorbent is not housed in the packaging member, the gas that is introduced to the inside of the outer package through the communication part of the outer package passes the vicinity of the moisture adsorbent before reaching the gas adsorbing member, or directly reaches the gas adsorbing member. In the latter case, moisture contained in the gas to be adsorbed is not removed. Accordingly, part of air that contains moisture reaches the gas adsorbing member. As a result, the gas adsorbent adsorbs the moisture and degrades. In this respect, according to the above aspect of the present invention, it can be assured that the gas to be adsorbed is caused to reach the gas adsorbing member through the passage of the former case.

According to the above configuration, the moisture adsorbent is housed in the packaging member, which has air permeability. Accordingly, by forming a through-hole in the outer package at a portion that is in contact with the packaging member, the gas to be adsorbed is introduced to the inside of the packaging member; the gas remains in the vicinity of the moisture adsorbent for a while; and then the gas passes through the packaging member to reach the gas adsorbing member. In this manner, a time during which the gas remains in the vicinity of the moisture adsorbent can be made long.

As a result, moisture contained in the gas is sufficiently adsorbed by the moisture adsorbent. Thus, the moisture in the gas that reaches the gas adsorbent is reduced to a greater degree.

According to the above configuration, even if the gas outside the outer package contains moisture, the gas in which the moisture has been reduced to a greater degree reaches the gas adsorbing member. This configuration makes it possible to provide the gas adsorbing device, which allows the gas adsorbent to exert most of its gas adsorption capacity to adsorb a gas that is adsorbable only by the gas adsorbent.

A fifth aspect of the present invention is such that, in the above fourth aspect, at least part of the packaging member and at least part of the outer package may be in close contact with each other at their surfaces.

According to the above configuration, at least part of the packaging member and at least part of the outer package are in close contact with each other at their surfaces. Accordingly, if a through-hole is formed in a portion where the outer package and the packaging member are in close contact with each other, a through-hole is also unavoidably formed in the packaging member, and the gas to be adsorbed that is present outside the outer package is assuredly introduced to the inside of the packaging member. Consequently, the gas to be adsorbed needs to pass the vicinity of the moisture adsorbent before reaching the gas adsorbent. Therefore, even if the gas to be adsorbed contains moisture, the moisture is adsorbed by the moisture adsorbent, and only the gas in which the moisture has been reduced reaches the gas adsorbent. This configuration makes it possible to provide the gas adsorbing device, which allows the gas adsorbent to exert most of its gas adsorption capacity to adsorb a gas that is adsorbable only by the gas adsorbent.

A sixth aspect of the present invention is such that, in the above fourth aspect, at least part of the packaging member and at least part of the outer package may be adhered to each other at their surfaces.

According to the above configuration, since at least part of the packaging member and at least part of the outer package are adhered to each other at their surfaces, the outer package and the packaging member are always in close contact with each other. Accordingly, even when a stress is applied to the outer package while handling the gas adsorbing device, the outer package can be prevented from being detached from the packaging member. Consequently, if a through-hole is formed in a portion where the outer package and the packaging member are adhered to each other, a through-hole is also unavoidably formed in the packaging member, and the gas to be adsorbed that is present outside the outer package is assuredly introduced to the inside of the packaging member.

The gas to be adsorbed needs to pass the vicinity of the moisture adsorbent before reaching the gas adsorbent. Therefore, even if the gas to be adsorbed contains moisture, the moisture is adsorbed by the moisture adsorbent, and only the gas in which the moisture has been reduced reaches the gas adsorbent. This configuration makes it possible to provide the gas adsorbing device, which allows the gas adsorbent to exert most of its gas adsorption capacity to adsorb a gas that is adsorbable only by the gas adsorbent.

According to a seventh aspect of the present invention, a hollow body houses the gas adsorbing device according to any one of the above first to sixth aspects in a decompressed internal space.

According to the above configuration, the hollow body housing the gas adsorbing device is applicable to, for example, a vacuum insulation panel of a refrigerator, the discharge space of a plasma display panel, an audio speaker device, vacuum packaging, a frame with a sealed space for use in long-term storage of a painting, and other various uses that require a decompressed internal space.

Hereinafter, embodiments of the gas adsorbing device of the present invention are described with reference to the drawings. It should be noted that the present invention is not limited by these embodiments.

Embodiment 1

Figure 1:
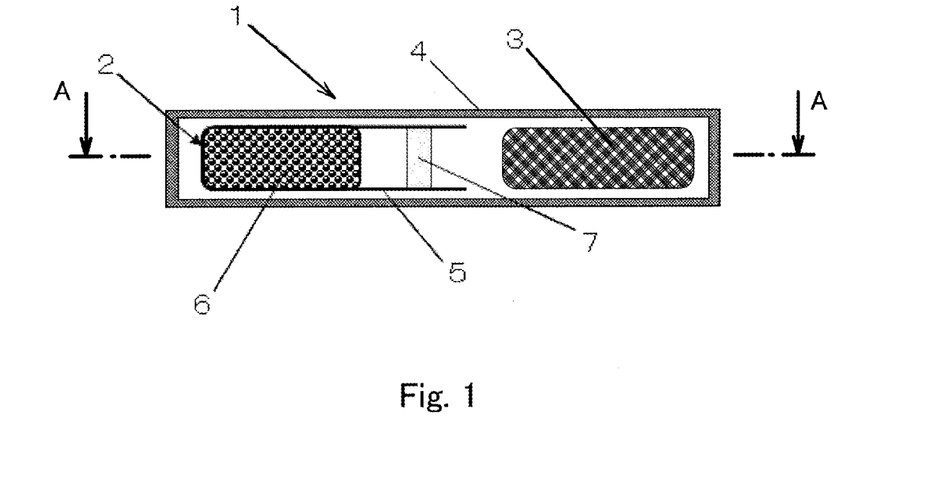
FIG. 1 is a schematic plan view of a gas adsorbing device in Embodiment 1 of the present invention.
Figure 2:
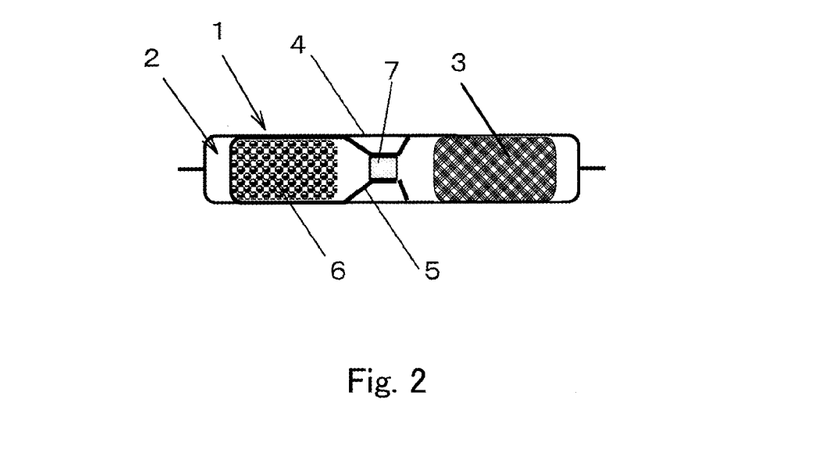
FIG. 2 is a sectional view of the gas adsorbing device 1 of FIG. 1, taken along line A-A of FIG. 1.

FIG. 1 is a schematic plan view of a gas adsorbing device in Embodiment 1 of the present invention. FIG. 2 is a sectional view of a gas adsorbing device 1 of FIG. 1, taken along line A-A of FIG. 1.

As shown in FIG. 1 and FIG. 2, the gas adsorbing device 1 according to the present embodiment includes a gas adsorbing member 2, a moisture adsorbent 3, and an outer package 4. The gas adsorbing member 2 and the moisture adsorbent 3 are arranged inside the outer package 4, such that an end portion of the gas adsorbing member 2 in its longitudinal direction and an end portion of the moisture adsorbent 3 in its longitudinal direction are adjacent to each other. The gas adsorbing member 2 and the moisture adsorbent 3 are housed in the outer package 4, and the inside of the outer package 4 is decompressed.

The gas adsorbing member 2 includes: a container 5 with an opening; a gas adsorbent 6 housed in the container 5; and a sealing member 7 sealing the opening. The moisture adsorbent 3 and the outer package 4 are partly in contact with each other, for example, at their surfaces.

Moreover, the gas adsorbing member 2 and the moisture adsorbent 3, which are made thin, are used in such a manner that a gas to be adsorbed is introduced into the gas adsorbing member 2 after the gas has passed the vicinity of the moisture adsorbent 3. Specifically, a communication part that allows the inside of the outer package 4 to be in communication with the outside is formed in the outer package 4 at a portion that is in contact with the moisture adsorbent 3, and the gas adsorbing member 2 and the moisture adsorbent 3 are arranged in series relative to a flow passage of the gas to be adsorbed. Accordingly, the thickness of the thickest portion of the gas adsorbing device 1 is the sum of: the thickness of the thickest portion of the gas adsorbing member 2 and the moisture adsorbent 3; and the thickness of the outer package 4. In this manner, the gas adsorbing device 1, which is a thin gas adsorbing device, can be provided.

In other words, since the gas adsorbing member 2 and the moisture adsorbent 3 are arranged to be adjacent to each other in their longitudinal direction, a gas that enters the inside of the outer package 4 through a communication passage can be caused to pass through the moisture adsorbent 3 before reaching the gas adsorbing member 2. In the thickness direction, the moisture adsorbent 3 and the gas adsorbing member 2 do not overlap each other. Therefore, by using the thin moisture adsorbent and the thin gas adsorbing member, the thickness of the gas adsorbing device 1 can be reduced.

In the above configuration, the container 5 packed with the gas adsorbent 6, and also the moisture adsorbent 3, are housed in the outer package 4. In addition, the gas adsorbent 6 is housed in the container 5. Accordingly, in order to cause the gas adsorbent 6 to adsorb the gas outside the gas adsorbing device 1, the following steps are necessary: forming, for example, a through-hole in the outer package 4 as the communication part, thereby introducing the gas to the inside of the outer package 4; and then, for example, forming a through-hole in the container 5, or destroying the sealing member 7, thereby introducing the gas inside the outer package 4 into the container 5.

In these steps, when the through-hole (the communication part) is formed in the outer package 4 at a portion that is in contact with the moisture adsorbent 3, the gas outside the outer package 4 is introduced to the inside of the outer package 4, and then immediately passes the vicinity of the moisture adsorbent 3, so that moisture in the gas is reduced. Thereafter, the gas reaches the gas adsorbing member 2.

This configuration makes it possible to provide the gas adsorbing device 1, which allows the gas adsorbent 6 to exert most of its gas adsorption capacity to adsorb a gas that is adsorbable only by the gas adsorbent 6.

Hereinafter, operations of the gas adsorbing device according to the present embodiment are described with reference to the drawings.

Figure 3:
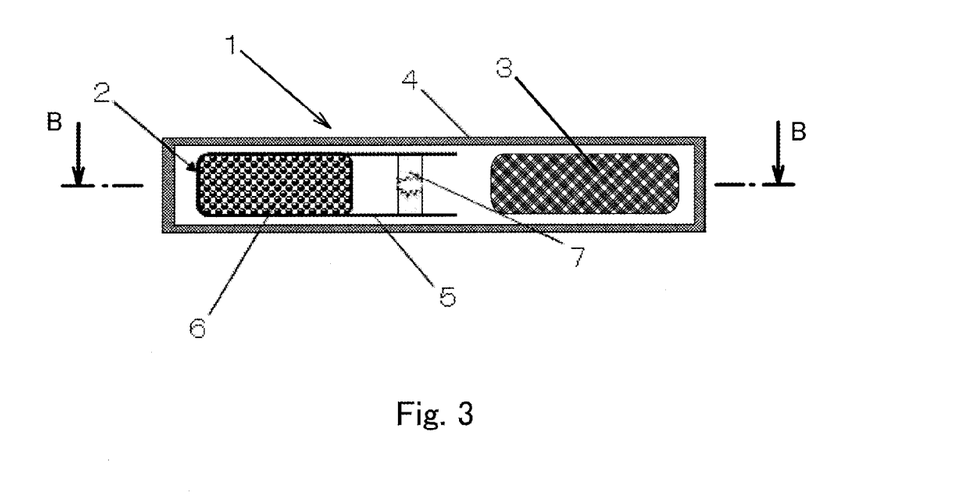
FIG. 3 is a schematic plan view of the gas adsorbing device in Embodiment 1 of the present invention after a sealing member has been destroyed.
Figure 4:
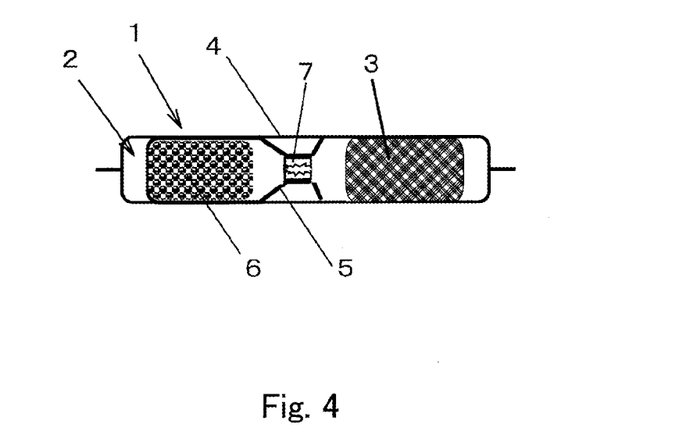
FIG. 4 is a sectional view of the gas adsorbing device of FIG. 3, taken along line B-B of FIG. 3.

FIG. 3 is a schematic plan view of the gas adsorbing device 1 in Embodiment 1 after the sealing member 7 has been destroyed. FIG. 4 is a sectional view of the gas adsorbing device 1 of FIG. 3, taken along line B-B of FIG. 3.

As shown in FIG. 3 and FIG. 4, since the sealing member 7 has been destroyed, the gas outside the container 5 can be adsorbed by the gas adsorbent 6 through the opening.

In Embodiment 1, since the sealing member 7 is a brittle member, the sealing member 7 can be destroyed by applying a stress from the outside of the outer package 4, and thereby a passage that allows the gas to flow from the outside of the container 5 to the inside of the container 5 can be readily formed. Since the sealing member 7 can be destroyed from the outside of the outer package 4, the sealing member 7 can be destroyed at any desired timing after the container 5 packed with the gas adsorbent 6 is sealed inside the outer package 4, and thereby the gas can be introduced to the inside of the container 5.

Figure 6:
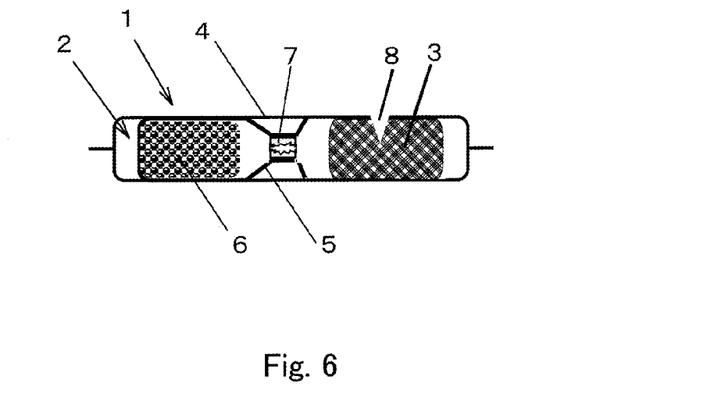
FIG. 6 is a sectional view of the gas adsorbing device of FIG. 5, taken along line C-C of FIG. 5.

FIG. 5 is a schematic plan view of the gas adsorbing device 1 in Embodiment 1 after a through-hole has been formed in the outer package 4. FIG. 6 is a sectional view of the gas adsorbing device 1 of FIG. 5, taken along line C-C of FIG. 5.

As shown in FIG. 5 and FIG. 6, a through-hole (communication part) 8 is formed in the outer package 4 at a portion that is in contact with the moisture adsorbent 3.

Figure 7:
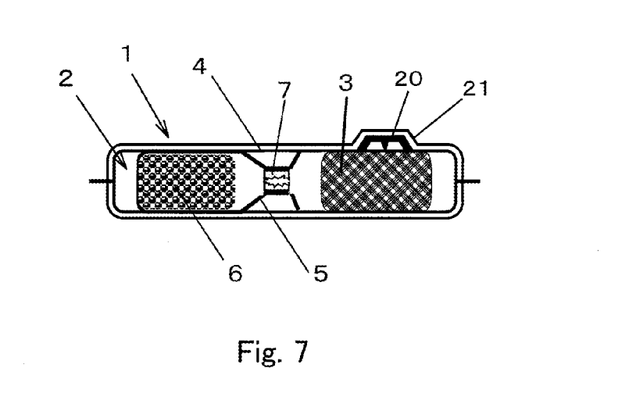
FIG. 7 is a sectional schematic diagram showing one example where the through-hole is yet to be formed in the outer package of the gas adsorbing device in Embodiment 1 of the present invention.

The manner of forming the through-hole 8 in the outer package 4 is not particularly limited. One example of the manner of forming the through-hole 8 in the outer package 4 is described below. FIG. 7 is a sectional schematic diagram showing one example where the through-hole is yet to be formed in the outer package 4 of the gas adsorbing device 1 in Embodiment 1. As shown in FIG. 7, a protrusion 20, which is set on the outer package 4 in the vicinity of the moisture adsorbent 3 in advance, is pushed against the outer package 4 with any method, and thereby the through-hole 8 can be formed in the outer package 4. In addition, the gas adsorbing device 1 and the protrusion 20 are decompression-sealed inside an outer skin member 21. The outer skin member 21 has a function of causing the protrusion 20 to be pushed against the gas adsorbing device 1 by means of atmospheric pressure. Accordingly, the through-hole 8 can be formed without performing any specific through-hole forming step.

The gas outside the gas adsorbing device 1 is introduced to the vicinity of the moisture adsorbent 3 through the through-hole 8 of the outer package 4. Moisture is removed from the gas when the gas passes the vicinity of the moisture adsorbent 3. The gas in which the moisture has been reduced is released inside the outer package 4. Next, the gas released inside the outer package 4 is introduced to the inside of the container 5 through the destroyed sealing member 7, and adsorbed by the gas adsorbent 6.

As described above, the gas to be adsorbed passes the vicinity of the moisture adsorbent 3 before reaching the gas adsorbent 6. Therefore, even if the gas to be adsorbed contains moisture, the moisture is adsorbed by the moisture adsorbent 3, and only the gas in which the moisture has been reduced reaches the gas adsorbent 6. Thus, the gas adsorbent 6 is allowed to exert most of its gas adsorption capacity to adsorb the gas, which is adsorbable only by the gas adsorbent 6.

The moisture adsorbent 3 is not particularly limited. However, desirably, the moisture adsorbent 3 is one that adsorbs moisture by chemical binding, such that once the moisture adsorbent 3 adsorbs moisture, the adsorbed moisture is retained firmly, and is not easily desorbed. For example, calcium oxide or potassium oxide may be used as the moisture adsorbent 3.

The outer package 4 is not particularly limited. However, desirably, the outer package 4 is formed of a material that has excellent gas barrier capability and that is capable of suppressing degradation of the gas adsorbent 6 even if the gas adsorbing device 1 is kept in the atmosphere for a long period of time after the sealing member 7 of the container 5 is destroyed. The outer package 4 is formed in the shape of a sealed pouch or container. The gas permeability of the outer package 4 may be $10^4$ [$cm^3/m^2 \cdot day \cdot atm$] or less, and desirably $10^3$ [$cm^3/m^2 \cdot day \cdot atm$] or less, and more desirably $10^2$ [$cm^3/m^2 \cdot day \cdot atm$] or less.

In addition, the outer package 4 needs to have flexibility, because the sealing member 7 therein needs to be destroyed when a stress is applied to the outer package 4 from the outside.

A plastic laminated film that has a gas barrier layer and that is formed in the shape of a pouch satisfies the required properties. Therefore, desirably, such a plastic laminated film is used as the outer package 4. The gas barrier layer is not particularly limited. For example, a metal foil such as an aluminum foil, or alternatively, a plastic film on which such a metal as aluminum, silica, carbon, etc., is vapor-deposited, may be used as the gas barrier layer.

Desirably, the container 5 has excellent gas barrier capability so that, while fabricating the gas adsorbing device 1, no gas will reach the gas adsorbent 6 to cause degradation of the gas adsorbent 6 even if the gas adsorbing member 2 is handled in the atmosphere. The container 5 is not particularly limited. However, desirably, the container 5 is formed as a thin metal container such as a copper or aluminum container, or formed of a plastic laminated film having a gas barrier layer. The gas barrier layer is not particularly limited. For example, a metal foil such as an aluminum foil, or alternatively, a plastic film on which such a metal as aluminum, silica, carbon, etc., is vapor-deposited, may be used as the gas barrier layer.

The gas adsorbent 6 is not particularly limited. Various adsorbents such as an adsorbent capable of chemisorption and an adsorbent capable of physical adsorption, for example, gas adsorbing materials such as various metal-based getters and zeolites, can be used as the gas adsorbent 6. These gas adsorbents are capable of adsorbing not only a gas to be adsorbed but also moisture, and work effectively particularly with a method of use applied in the present invention, the method suppressing degradation of the gas adsorbents due to moisture adsorption and allowing the gas adsorbents to exert their gas adsorption capacity sufficiently.

The sealing member 7 is not particularly limited. However, desirably, the sealing member 7 has excellent gas barrier capability and excellent adhesion to the container 5 so that, while fabricating the gas adsorbing device 1, no gas will reach the gas adsorbent 6 to cause degradation of the gas adsorbent 6 even if the gas adsorbing member 2 is handled in the atmosphere. Moreover, desirably, the sealing member 7 is a brittle member so that the sealing member 7 will be readily destroyed when a stress is applied from the outside of the outer package 4.

The brittle member herein refers to a member with a low elastic deformability against a stress applied from the outside, and the brittle member is destroyed when its elastic deformability is exceeded. Desirably, the elastic deformation range of the brittle member is 1% or less, and more desirably, 0.5% or less. The brittle member is not particularly limited. For example, an inorganic material such as glass or ceramics can be used to form the brittle member.

According to the above configuration, the gas to be adsorbed needs to pass the vicinity of the moisture adsorbent 3 before reaching the gas adsorbent 6. Therefore, even if the gas to be adsorbed contains moisture, the moisture is adsorbed by the moisture adsorbent 3, and only the gas in which the moisture has been reduced reaches the gas adsorbent 6. This configuration makes it possible to provide the gas adsorbing device 1, which allows the gas adsorbent 6 to exert most of its gas adsorption capacity to adsorb a gas that is adsorbable only by the gas adsorbent 6.

Moreover, the gas adsorbing member 2 and the moisture adsorbent 3, which are made thin, are used in such a manner that the gas adsorbing member 2 and the moisture adsorbent 3 are arranged to be adjacent to each other in their longitudinal direction so that the gas to be adsorbed will pass through the moisture adsorbent 3 before reaching the gas adsorbing member 2. Accordingly, the thickness of the thickest portion of the gas adsorbing device 1 is the sum of: the thickness of the thickest portion of the gas adsorbing member 2 and the moisture adsorbent 3; and the thickness of the outer package 4. In this manner, the thin gas adsorbing device 1 can be provided.

The term "thin" herein means that, among the longitudinal, lateral, and height dimensions of the moisture adsorbent and the gas adsorbing member, the height dimension of the moisture adsorbent and the height dimension of the gas adsorbing member are less than their longitudinal and lateral dimensions. For example, the height dimension of the moisture adsorbent and the height dimension of the gas adsorbing member are 10 mm or less, or alternatively, 5 mm or less under more restricted conditions, although these height dimensions vary depending on the intended use. For example, desirably, the ratio of the thickness of the gas adsorbing device 1 to the length of the gas adsorbing member 2 and the moisture adsorbent 3 in their longitudinal direction is 1/10 or less. Desirably, the moisture adsorbent 3 is such that the height dimension of the moisture adsorbent 3 is twice or more as great as the length dimension of the moisture adsorbent 3. More desirably, the height dimension is five times or more as great as the length dimension, and more desirably, the height dimension is ten times or more as great as the length dimension.

Air adsorption amount evaluation was conducted on Embodiment 1 of the present invention while varying the sealing member and the humidity in the storage environment of the sealing member. The evaluation results are indicated below in Example 1 to Example 6.

In Examples 1 to 6, gas adsorbing devices each include a gas adsorbing member, a moisture adsorbent, and an outer package. The gas adsorbing member and the moisture adsorbent are housed in the outer package, and the inside of the outer package is decompressed. The gas adsorbing member includes a container, a gas adsorbent with which the container is packed, and a sealing member sealing an opening of the container. The moisture adsorbent and the outer package are partly in contact with each other at their surfaces.

Coarse calcium oxide was used as the moisture adsorbent. A plastic laminated film that includes a low-density polyethylene film as a sealing layer, an aluminum foil as a barrier layer, and a nylon film as a protective layer was used as the outer package. A cylindrical aluminum container with an opening at its one end was used as the container. A zeolite was used as the gas adsorbent.

The coarse moisture adsorbent herein was placed in a pouch-shaped member formed of a nonwoven fabric, the nonwoven fabric having no influence on air permeability. The thickness of the pouch-shaped member with the moisture adsorbent therein was adjusted to 2 mm, and used.

Next, an evaluation method used to evaluate the air adsorption amount is described.

A pouch product formed of a laminated film that allows entry of 0.1 cc of air per day was used as an outer skin member. Each gas adsorbing device was vacuum sealed inside the outer skin member together with a honeycomb spacer. The gas adsorbing devices thus vacuum sealed were stored under predetermined conditions. The gas adsorbing devices were set in an environment of 10 Pa once a day, and the presence or absence of expansion of the outer skin member was observed for each gas adsorbing device.

When the expansion started, for example, in ten days, the adsorption amount under 10 Pa was assumed to be 0.1 cc×10=1 cc.

The destruction of the sealing member was performed in the atmosphere, and thereafter, a communication part was formed in the outer package. The manner of unsealing the outer package applied herein is as follows: when the gas adsorbing device with the protrusion set in the vicinity of the moisture adsorbent is vacuum sealed together with the spacer, the protrusion receives a stress due to the atmospheric pressure; as a result, the protrusion is pushed against the outer package, and a through-hole (the communication part) is formed in the outer package; and thereby the outer package is unsealed.

The number of gas adsorbing devices subjected to measurement, i.e., the number n, was 10 under each set of conditions.

Table 1 below briefly shows evaluation results of Examples 1 to 6.

TABLE 1

|  | Example 1 | Example 2 | Example 3 | Example 4 | Example 5 | Example 6 | Example 7 |
|---|---|---|---|---|---|---|---|
| Sealing Member | Brazing Filler Metal | ← | ← | ← | Glass | ← | ← |
| Packaging Member | Absent | ← | ← | ← | ← | ← | Present |
| Close Contact by Surface | Absent | ← | Present | ← | Absent | ← | Present |
| Adhesion | Absent | ← | ← | Present | Absent | ← | Present |
| Humidity (% Rh) | 0 | 60 | ← | ← | ← | 80 | ← |
| Number of Times of Bending | 10 | ← | ← | ← | 1 | ← | ← |
| Maximum Adsorption Amount (cc) | 1 | 0.9 | 0.9 | 0.9 | 0.9 | 0.8 | 1 |
| Thickness (mm) | 2.7 | 2.7 | 2.7 | 2.7 | 2.7 | 2.7 | 2.7 |

First, in Example 1, the adsorption capacity of the gas adsorbing member was evaluated in relation to air containing no moisture. In each of the other Examples, the adsorption capacity of the gas adsorbing member was evaluated in relation to air containing moisture.

Example 1

In Example 1, a brazing filler metal formed of an aluminum-silicon alloy was used as the sealing member. The humidity in the storage environment was set to 0% Rh.

The number of times of bending the sealing member portion of the container from the outside of the outer package in order to destroy the sealing member was 10. The reason for this is that, since the brazing filler metal is formed of an alloy and is flexible, it is necessary to bend the sealing member a plurality of times in order to destroy the sealing member assuredly.

In order to clarify the number of times of bending to perform to destroy the sealing member, the number of times of bending the sealing member and the probability of destruction of the sealing member were evaluated in advance. The following method was used for the evaluation: the number n was set to 10; each sealing member was bent once, three times, five times, and eight times; and the number of sealing members destroyed as a result of the bending was evaluated. The results were as follows: none of the sealing members was destroyed when bent once; three sealing members were destroyed when bent three times; eight sealing members were destroyed when bent five times; and ten sealing members were destroyed when bent eight times. Therefore, in order to destroy each sealing member assuredly, two more times were added to the number of times of bending each sealing member, i.e., ten times.

In the evaluation of the adsorption amount, expansion of the outer skin member was observed in ten days after the start of the evaluation. Accordingly, the air adsorption amount of these gas adsorbing devices under 10 Pa was assumed to be 1 cc.

The humidity in the storage environment was 0% Rh. Therefore, considering that air reaching the gas adsorbing member contained no moisture, it was assumed that the gas adsorbent was able to adsorb 1 cc of the air when all the adsorption capacity of the gas adsorbent was exerted to adsorb the air.

In Example 1, the thickness of the moisture adsorbent is 2.0 mm; the thickness of the gas adsorbent is 2.5 mm; and the thickness of the outer package is 0.1 mm. Accordingly, the thickness of the gas adsorbing device is the sum of the thickness of the thickest portion of the gas adsorbent and the thickness of the outer package, i.e., 2.7 mm.

Example 2

In Example 2, a brazing filler metal formed of an aluminum-silicon alloy was used as the sealing member. The humidity in the storage environment was set to 60% Rh. Similar to Example 1, the number of times of bending the sealing member portion of the container was 10.

In the evaluation of the adsorption amount, expansion of the outer skin member was observed in eight gas adsorbing devices out of the ten gas adsorbing devices nine days after the start of the evaluation. Accordingly, the maximum air adsorption amount of these gas adsorbing devices under 10 Pa was assumed to be 0.9 cc.

The air adsorption amount of 0.9 cc is inferior to the air adsorption amount in Example 1, in which there is no degradation due to moisture. However, it is understood that, compared to the air adsorption amount of 0.3 cc indicated in Comparative Example 1 where no moisture adsorbent was used, degradation due to moisture adsorption was suppressed significantly.

It is understood from the above that, in the gas adsorbing device in Example 2, moisture was adsorbed by the moisture adsorbent, and only air in which the moisture had been reduced reached the gas adsorbent, which allowed the gas adsorbent to exert most of its gas adsorption capacity to adsorb the air, which was adsorbable only by the gas adsorbent.

Expansion of the outer skin member was observed in the remaining two gas adsorbing devices out of the ten gas adsorbing devices three days after the start of the evaluation. Accordingly, the air adsorption amount of these two gas adsorbing devices under 10 Pa was assumed to be 0.3 cc.

The air adsorption amount of 0.3 cc is the same as 0.3 cc indicated in Comparative Example 1 where no moisture adsorbent is used, and thus it is understood that degradation due to moisture adsorption is not suppressed. In order to clarify the cause of this phenomenon, the outer skin member was unsealed and examined. As a result, the cause was found to be as follows: since the sealing member was bent a large number of times, the protrusion was moved away from the vicinity of the moisture adsorbent during the bending work; and in the gas adsorbing device, air with unreduced moisture directly reached the gas adsorbing member without passing the vicinity of the moisture adsorbent.

In Example 2, the thickness of the moisture adsorbent is 2.0 mm; the thickness of the gas adsorbent is 2.5 mm; and the thickness of the outer package is 0.1 mm. Accordingly, the thickness of the gas adsorbing device is the sum of the thickness of the thickest portion of the gas adsorbent and the thickness of the outer package, i.e., 2.7 mm, which is thin. Even with such a thin structure, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

Example 3

In Example 3, a brazing filler metal formed of an aluminum-silicon alloy is used as the sealing member, and surfaces of the moisture adsorbent and the outer package are partly in close contact with each other.

The humidity in the storage environment was set to 60% Rh. Similar to Example 1, the number of times of bending the sealing member portion of the container was 10.

In the evaluation of the adsorption amount, expansion of the outer skin member was observed in nine gas adsorbing devices out of the ten gas adsorbing devices nine days after the start of the evaluation. Accordingly, the maximum air adsorption amount of these gas adsorbing devices under 10 Pa was assumed to be 0.9 cc.

The air adsorption amount of 0.9 cc is inferior to the air adsorption amount in Example 1, in which there is no degradation due to moisture. However, it is understood that, compared to the air adsorption amount of 0.3 cc indicated in Comparative Example 1 where no moisture adsorbent is used, degradation due to moisture adsorption is suppressed significantly.

It is understood from the above that, in the gas adsorbing device in Example 3, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

Expansion of the outer skin member was observed in the remaining one gas adsorbing device out of the ten gas adsorbing devices three days after the start of the evaluation. Accordingly, the air adsorption amount of the one gas adsorbing device under 10 Pa was assumed to be 0.3 cc.

The air adsorption amount of 0.3 cc was observed in the one gas adsorbing device, which was less than in Example 2 where the air adsorption amount of 0.3 cc was observed in two gas adsorbing devices. The reason for this is as follows: since the moisture adsorbent and the outer package are in close contact with each other at their surfaces, there is a high probability that even if the position of the protrusion is moved, the through-hole is still formed in the vicinity of the moisture adsorbent, and that air whose moisture has been reduced by the moisture adsorbent reaches the gas adsorbing member.

In Example 3, the thickness of the moisture adsorbent is 2.0 mm; the thickness of the gas adsorbent is 2.5 mm; and the thickness of the outer package is 0.1 mm. Accordingly, the thickness of the gas adsorbing device is the sum of the thickness of the thickest portion of the gas adsorbent and the thickness of the outer package, i.e., 2.7 mm, which is thin. Even with such a thin structure, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

Example 4

In Example 4, a brazing filler metal formed of an aluminum-silicon alloy is used as the sealing member, and surfaces of the moisture adsorbent and the outer package are partly adhered to each other by thermal adhesion. The humidity in the storage environment was set to 60% Rh. Similar to Example 1, the number of times of bending the sealing member portion of the container was 10.

In the evaluation of the adsorption amount, expansion of the outer skin member was observed in all of the ten gas adsorbing devices nine days after the start of the evaluation. Accordingly, the maximum air adsorption amount of these gas adsorbing devices under 10 Pa was assumed to be 0.9 cc.

The air adsorption amount of 0.9 cc is inferior to the air adsorption amount in Example 1, in which there is no degradation due to moisture. However, it is understood that, compared to the air adsorption amount of 0.3 cc indicated in Comparative Example 1 where no moisture adsorbent is used, degradation due to moisture adsorption is suppressed significantly.

It is understood from the above that, in the gas adsorbing device in Example 4, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

The adsorption amount of 0.9 cc was observed in all of the ten gas adsorbing devices. The reason for this is as follows: since the surfaces of the moisture adsorbent and the outer package are partly adhered to each other by thermal adhesion, there is a higher probability that even if the position of the protrusion is moved, the through-hole is still formed in the vicinity of the moisture adsorbent, and that air whose moisture has been reduced by the moisture adsorbent reaches the gas adsorbing member.

In Example 4, the thickness of the moisture adsorbent is 2.0 mm; the thickness of the gas adsorbent is 2.5 mm; and the thickness of the outer package is 0.1 mm. Accordingly, the thickness of the gas adsorbing device is the sum of the thickness of the thickest portion of the gas adsorbent and the thickness of the outer package, i.e., 2.7 mm, which is thin. Even with such a thin structure, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

Example 5

In Example 5, glass was used as the sealing member. The humidity in the storage environment was set to 60% Rh. The number of times of bending the sealing member portion of the container from the outside of the outer package in order to destroy the sealing member was once. The reason for this is that, since the glass is a brittle member, bending the sealing member once will destroy the glass, i.e., the sealing member, assuredly.

In the evaluation of the adsorption amount, expansion of the outer skin member was observed in all of the ten gas adsorbing devices nine days after the start of the evaluation. Accordingly, the maximum air adsorption amount of these gas adsorbing devices under 10 Pa was assumed to be 0.9 cc.

The air adsorption amount of 0.9 cc is inferior to the air adsorption amount in Example 1, in which there is no degradation due to moisture. However, it is understood that, compared to the air adsorption amount of 0.3 cc indicated in Comparative Example 1 where no moisture adsorbent is used, degradation due to moisture adsorption is suppressed significantly.

It is understood from the above that, in the gas adsorbing device in Example 5, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

The adsorption amount of 0.9 cc was observed in all of the ten gas adsorbing devices. The reason for this is as follows: since the number of times of bending the sealing member is just once, there is a higher probability that the position of the protrusion is not moved and the through-hole is formed in the vicinity of the moisture adsorbent, and that air whose moisture has been reduced by the moisture adsorbent reaches the gas adsorbing member.

In Example 5, the thickness of the moisture adsorbent is 2.0 mm; the thickness of the gas adsorbent is 2.5 mm; and the thickness of the outer package is 0.1 mm. Accordingly, the thickness of the gas adsorbing device is the sum of the thickness of the thickest portion of the gas adsorbent and the thickness of the outer package, i.e., 2.7 mm, which is thin. Even with such a thin structure, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

Example 6

In Example 6, glass was used as the sealing member. The humidity in the storage environment was set to 80% Rh.

In the evaluation of the adsorption amount, expansion of the outer skin member was observed in all of the ten gas adsorbing devices eight days after the start of the evaluation.

Accordingly, the maximum air adsorption amount of these gas adsorbing devices under 10 Pa was assumed to be 0.8 cc.

It is understood from the above that, in the gas adsorbing device in Example 6, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

In Example 6, the thickness of the moisture adsorbent is 2.0 mm; the thickness of the gas adsorbent is 2.5 mm; and the thickness of the outer package is 0.1 mm. Accordingly, the thickness of the gas adsorbing device is the sum of the thickness of the thickest portion of the gas adsorbent and the thickness of the outer package, i.e., 2.7 mm, which is thin. Even with such a thin structure, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent. Moreover, even though the humidity is as high as 80% Rh, in most cases, the moisture adsorbent can be used with its thickness kept in a range of up to 2.5 mm, and the maximum air adsorption amount can be brought close to 1 cc with the thickness of the gas adsorbing device kept to 2.7 mm.

Embodiment 2

Figure 8:
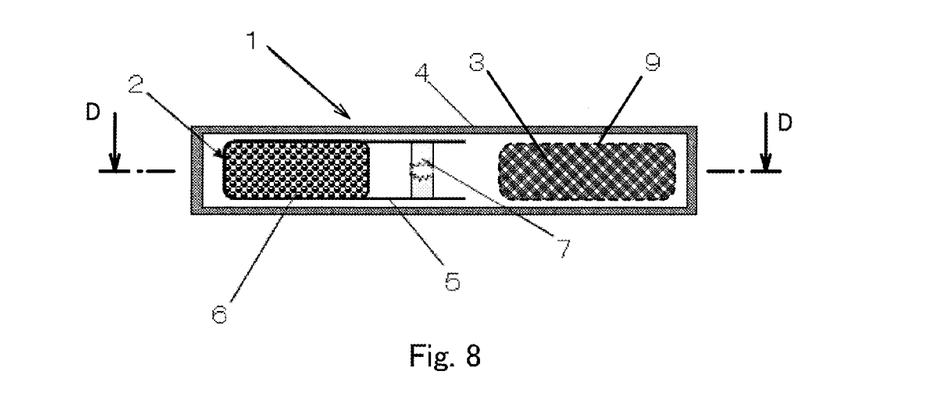
FIG. 8 is a schematic plan view of a gas adsorbing device in Embodiment 2 of the present invention.
Figure 9:
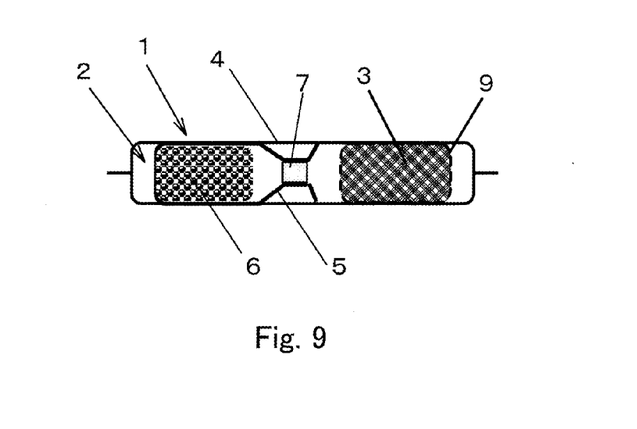
FIG. 9 is a sectional view of the gas adsorbing device of FIG. 8, taken along line D-D of FIG. 8.
Figure 10:
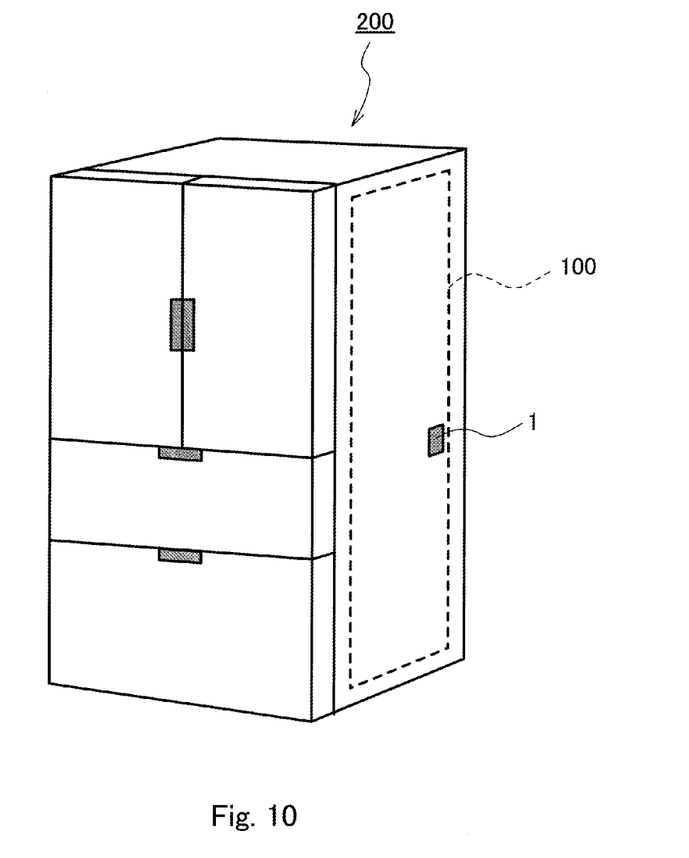
FIG. 10 is a schematic diagram showing a case where a hollow body housing a gas adsorbing device of one embodiment of the present invention is applied to a vacuum insulation panel of a refrigerator.
Figure 11:
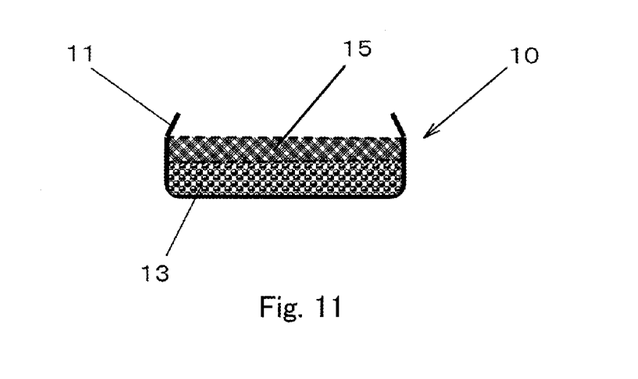
FIG. 11 is a schematic diagram showing a conventional gas adsorbing device.

FIG. 8 is a schematic plan view of a gas adsorbing device in Embodiment 2 of the present invention. FIG. 9 is a sectional view of the gas adsorbing device of FIG. 8, taken along line D-D of FIG. 8.

In FIG. 8 and FIG. 9, the moisture adsorbent 3 is housed in a packaging member 9. Part of the outer package 4 and part of the packaging member 9 are in close contact with each other at their surfaces by thermal adhesion. The other configurational features are the same as in Embodiment 1.

According to the above configuration, the moisture adsorbent is housed in the packaging member, which has air permeability. Accordingly, by forming a through-hole in the outer package at a portion that is in contact with the packaging member, a gas to be adsorbed is entirely introduced to the inside of the packaging member; the gas remains in the vicinity of the moisture adsorbent for a while; and then the gas passes through the packaging member to reach the gas adsorbing member. In this manner, a time during which the gas remains in the vicinity of the moisture adsorbent can be made long.

As a result, moisture contained in the gas is sufficiently adsorbed by the moisture adsorbent. Thus, the moisture in the gas that reaches the gas adsorbent is reduced to a greater degree.

Moreover, at least part of the packaging member 9 and at least part of the outer package 4 are in close contact with each other at their surfaces. Accordingly, if a through-hole is formed in a portion where the outer package 4 and the packaging member 9 are in close contact with each other, a through-hole is also unavoidably formed in the packaging member 9, and the gas to be adsorbed that is present outside the outer package 4 is assuredly introduced to the inside of the packaging member 9. Consequently, the gas to be adsorbed needs to pass the vicinity of the moisture adsorbent 3 before reaching the gas adsorbent 6. Therefore, even if the gas to be adsorbed contains moisture, the moisture is adsorbed by the moisture adsorbent 3, and only the gas in which the moisture has been reduced reaches the gas adsorbent 6. This configuration makes it possible to provide the gas adsorbing device, which allows the gas adsorbent 6 to exert most of its gas adsorption capacity to adsorb a gas that is adsorbable only by the gas adsorbent 6.

In Embodiment 2, the packaging member 9 is not particularly limited. However, desirably, in order to allow the gas to remain inside the packaging member 9 for a while and then release the gas from the inside of the packaging member 9, the packaging member 9 has moderate air permeability and can be brought into close contact with the outer package by thermal adhesion. For example, a nonwoven fabric or cellulose in the shape of a pouch may be used as the packaging member 9.

The term "close contact" herein means that a surface of one member and a surface of the other member are, at least partly, in planar contact with each other. The term "adhered" herein means that portions that are in contact with each other are joined together.

Hereinafter, in relation to Embodiment 2 of the present invention, a description of Example 7 is given, in which a method of bringing the sealing member, the packaging member, and the outer package into close contact with each other is described. In Example 7, an evaluation was conducted while varying the humidity in the storage environment. The evaluation results are indicated below.

Example 7

In Example 7, glass was used as the sealing member. A nonwoven fabric formed of PET fiber, having an average fiber diameter of 10 μm and an average pore diameter of 50 μm, was used to form the packaging member. The packaging member and the sealing layer of the outer package are adhered to each other at their surfaces by thermal adhesion. The humidity in the storage environment was set to 80% Rh.

The number of times of bending the sealing member portion of the container from the outside of the outer package in order to destroy the sealing member was once. The reason for this is that, since the glass is a brittle member, bending the sealing member once will destroy the glass, i.e., the sealing member, assuredly.

In the evaluation of the adsorption amount, expansion of the outer skin member was observed in all of the ten gas adsorbing devices ten days after the start of the evaluation. Accordingly, the maximum air adsorption amount of these gas adsorbing devices under 10 Pa was assumed to be 1 cc.

The air adsorption amount of 1 cc is the same as the air adsorption amount in Example 1, in which there is no degradation due to moisture. The reason for this is as follows: the gas outside the outer skin member is entirely introduced to the inside of the packaging member; the gas remains in the vicinity of the moisture adsorbent for a long period of time, so that moisture in the gas is reduced more assuredly; and then only air in which the moisture has been reduced reaches the gas adsorbing member.

It is understood from the above that, in the gas adsorbing device in Example 7, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

In Example 7, the thickness of the moisture adsorbent is 2.0 mm; the thickness of the gas adsorbent is 2.5 mm; and the thickness of the outer package is 0.1 mm. Accordingly, the thickness of the gas adsorbing device is the sum of the thickness of the thickest portion of the gas adsorbent and the thickness of the outer package, i.e., 2.7 mm, which is thin. Even with such a thin structure, moisture is adsorbed by the moisture adsorbent, and only air in which the moisture has been reduced reaches the gas adsorbent, which allows the gas adsorbent to exert most of its gas adsorption capacity to adsorb the air, which is adsorbable only by the gas adsorbent.

Hereinafter, examples compared with the present invention are described in Comparative Examples 1 to 4.

Table 2 below briefly shows configurations and the like of Comparative Examples 1 to 4.

TABLE 2

|  | Comparative Example 1 | Comparative Example 2 | Comparative Example 3 | Comparative Example 4 |
| --- | --- | --- | --- | --- |
| Sealing Member | Glass | ← | Absent | ← |
| Packaging Member | Absent | ← | ← | ← |
| Close Contact by Surface | — | ← | ← | ← |
| Adhesion | — | ← | ← | ← |
| Humidity (% Rh) | 60% | 80% | 60% | ← |
| Number of Times of Bending | 1 | ← | — | ← |
| Maximum Adsorption Amount (cc) | 0.3 | 0.2 | 0.4 | 0.8 |
| Thickness (mm) | 2.7 | 2.7 | 7 | 28 |

Comparative Example 1

Comparative Example 1 includes a gas adsorbing member and an outer package. The gas adsorbing member is housed in the outer package, and the inside of the outer package is decompressed.

The gas adsorbing member includes a container with an opening, a gas adsorbent housed in the container, and a sealing member sealing an opening of the container.

Glass was used as the sealing member. The humidity in the storage environment was set to 60% Rh.

The number of times of bending the sealing member portion of the container from the outside of the outer package in order to destroy the sealing member was once. The reason for this is that, since the glass is a brittle member, bending the sealing member once will destroy the glass, i.e., the sealing member, assuredly.

In the evaluation of the adsorption amount, expansion of the outer skin member was observed in all of the ten gas adsorbing devices three days after the start of the evaluation. Accordingly, the maximum air adsorption amount of these gas adsorbing devices under 10 Pa was assumed to be 0.3 cc.

The air adsorption amount of 0.3 cc is significantly less than the air adsorption amount of 1 cc in the case where air contains no moisture. The reason for this is as follows: since no moisture adsorbent was used in Comparative Example 1, air containing moisture reached the gas adsorbing member; the gas adsorbent adsorbed the moisture; and thereby most of the adsorption capacity of the gas adsorbent for adsorbing the air, which is adsorbable only by the gas adsorbent, degraded.

In Comparative Example 1, the thickness of the gas adsorbent is 2.5 mm, and the thickness of the outer package is 0.1 mm. Accordingly, the thickness of the gas adsorbing device is the sum of the thickness of the thickest portion of the gas adsorbent and the thickness of the outer package, i.e., 2.7 mm Comparative Example 2

Comparative Example 2 includes a gas adsorbing member and an outer package. The gas adsorbing member is housed in the outer package, and the inside of the outer package is decompressed. The gas adsorbing member includes a container with an opening, a gas adsorbent housed in the container, and a sealing member sealing an opening of the container.

The number of times of bending the sealing member portion of the container from the outside of the outer package in order to destroy the sealing member was once. The reason for this is that, since the glass is a brittle member, bending the sealing member once will destroy the glass, i.e., the sealing member, assuredly.

In the evaluation of the adsorption amount, expansion of the outer skin member was observed in all of the ten gas adsorbing devices two days after the start of the evaluation. Accordingly, the maximum air adsorption amount of these gas adsorbing devices under 10 Pa was assumed to be 0.2 cc.

The air adsorption amount of 0.2 cc is significantly less than the air adsorption amount of 1 cc in the case where air contains no moisture. The reason for this is as follows: since no moisture adsorbent was used in Comparative Example 2, air containing moisture reached the gas adsorbing member; the gas adsorbent adsorbed the moisture; and thereby most of the adsorption capacity of the gas adsorbent for adsorbing the air, which is adsorbable only by the gas adsorbent, degraded.

Moreover, it is understood that, since the humidity in the storage environment is 80% Rh in Comparative Example 2, the degree of the degradation is greater than in a case where the humidity in the storage environment is 60% Rh.

In Comparative Example 2, the thickness of the gas adsorbent is 2.5 mm, and the thickness of the outer package is 0.1 mm. Accordingly, the thickness of the gas adsorbing device is the sum of the thickness of the thickest portion of the gas adsorbent and the thickness of the outer package, i.e., 2.7 mm Comparative Example 3

Next, a gas adsorbing device configured in the same manner as a conventional gas adsorbing device was prepared as a comparative example, and was evaluated.

In Comparative Example 3, the gas adsorbing device with the following configuration was used: a first pellet, formed of an air adsorbent shaped to have a thickness of 3 mm, was set at the bottom of an upper open container formed of aluminum having a thickness of 1 mm; and a second pellet, formed of a moisture adsorbent shaped to have a thickness of 3 mm, was set in such a manner as to fully cover the first pellet.

In the above-described configuration, the thickness of the gas adsorbing device, i.e., the sum of the thicknesses of the respective components, is 7 mm, which is greater than the thickness of the gas adsorbing device described in each Example. Therefore, it is difficult to apply the gas adsorbing device having the above-described configuration to, for example, a vacuum insulation panel having a thickness of 5 mm.

In the evaluation of the adsorption amount, expansion of the outer skin member was observed in all of the ten gas adsorbing devices four days after the start of the evaluation. Accordingly, the maximum air adsorption amount of these gas adsorbing devices under 10 Pa was assumed to be 0.4 cc.

The air adsorption amount of 0.4 cc is less than the air adsorption amount of 1 cc in the case where air contains no moisture. The reason for this is as follows: since the thickness of the second pellet is 3 mm, which is thin, moisture was not reduced sufficiently; consequently, air containing moisture reached the gas adsorbent; and thereby most of the adsorption capacity of the gas adsorbent for adsorbing the air, which is adsorbable only by the gas adsorbent, degraded.

Comparative Example 4

In view of the above, evaluation was conducted in order to allow a gas adsorbing device configured in the same manner as a conventional gas adsorbing device to exert the same level of adsorption capacity as that exerted in the above-described Examples.

In Comparative Example 4, the gas adsorbing device with the following configuration was used: a first pellet, formed of an air adsorbent shaped to have a thickness of 3 mm, was set at the bottom of an upper open container formed of aluminum having a thickness of 1 mm; and a second pellet, formed of a moisture adsorbent shaped to have a thickness of 25 mm, was set in such a manner as to fully cover the first pellet.

In the evaluation of the adsorption amount, expansion of the outer skin member was observed in all of the ten gas adsorbing devices eight days after the start of the evaluation. Accordingly, the maximum air adsorption amount of these gas adsorbing devices under 10 Pa was assumed to be 0.8 cc.

The air adsorption amount of 0.8 cc is greater than the air adsorption amount in Comparative Example 3. The reason for this is as follows: since the second pellet has a thickness of 25 mm, which is thick, a passage for the gas to be adsorbed, the passage extending in the vicinity of the moisture adsorbent, is long; and consequently, air in which the moisture has been reduced reaches the gas adsorbent, which allows the gas adsorbent to exert most of its gas adsorption capacity to adsorb the air, which is adsorbable only by the gas adsorbent.

However, the thickness of the above-described gas adsorbing device, i.e., the sum of the thicknesses of the respective components, is 28 mm, which is significantly greater than the thickness of 2.7 mm of the gas adsorbing device described in each Example. Therefore, it is difficult to apply the gas adsorbing device having the above-described configuration to a member whose thickness is restricted, for example, a vacuum insulation panel having a thickness of 10 mm Embodiment 3

A hollow body housing the gas adsorbing device of either one of the above-described embodiments is applicable to, for example, a vacuum insulation panel of a refrigerator, vacuum packaging, a frame with a sealed space for use in long-term storage of a painting or the like, and other various uses that require a decompressed internal space.

In particular, in the case of storing a painting or work of art for a long term, during its transportation or conveyance that causes changes in the storage environment, there is a concern that the painting or work of art becomes, for example, moldy or deteriorated due to humidity or gas. However, by storing the painting or work of art in a hollow body that houses the above-described gas adsorbing device, special advantageous effects can be achieved, i.e., deterioration of the painting or work of art can be prevented, and its quality can be kept in a favorable state.

FIG. 7 is a schematic diagram showing a case where a hollow body housing the gas adsorbing device of one embodiment of the present invention is applied to a vacuum insulation panel of a refrigerator. As shown in FIG. 7, a vacuum insulation panel 100 including the gas adsorbing device 1 is disposed in a side wall of a refrigerator 200.

In the side wall of the refrigerator 200, the vacuum insulation panel 100 is disposed together with a formed insulating material (not shown). The vacuum insulation panel 100 includes a core material and the gas adsorbing device 1, and is decompression-sealed.

The vacuum insulation panel 100 according to the present embodiment is, in its production process, subjected to vacuum drawing and sealed off. Thereafter, when assembling the refrigerator, a through-hole (the communication part) is formed in the outer package 4 of the gas adsorbing device 1, and then, for example, the sealing member 7 is destroyed, thereby performing double decompressing. The double decompressing makes it possible to greatly increase the degree of vacuum.

Variations

In the above-described embodiments, the through-hole (the communication part) of the outer package 4 is formed by pushing down the protrusion 20 (an unsealing pin) against the outer package 4 by utilizing the flexibility of the outer package 4 and the atmospheric pressure. However, the manner of forming the through-hole is not limited to this example. Alternatively, a notch may be formed in the surface of the outer package 4 in advance, or the outer package may be formed of a material that is easy to tear, for example, paper. In such a case, force may be applied over the outer skin member by utilizing the flexibility of the outer skin member in which the gas adsorbing device 1 is decompression-sealed, and thereby the through-hole (the communication part) can be formed in the outer package 4. Further alternatively, the outer package may be formed of at least two kinds of materials that have different heat expansion rates from each other. After the gas adsorbing device is set inside a product, heat may be applied, and thereby a gap (the communication part) may be formed between the two materials.

All of the above-described through-hole forming methods are applicable to products formed of a soft material, such as vacuum insulation panels. Meanwhile, desirably, the aforementioned method of: forming the outer package by using materials that have different heat expansion rates from each other; and applying heat to the outer package to form a gap (the communication part), is applied to products that are not externally deformed easily. Examples of the products that are not externally deformed easily include: a vacuum insulation casing applied to a refrigerator body or the like, the casing being subjected to vacuum drawing and sealed off; and a metal or hard-resin casing applied, for example, to the discharge space of a plasma display panel for use in a television or to an audio speaker device.

In the above-described embodiments, force is applied over the outer package by utilizing the flexibility of the outer package, such that the container and the sealing member of the gas adsorbing member are deformed, and thereby the sealing member is destroyed. In this manner, the opening of the gas adsorbing member is formed. Since it is necessary to destroy only the sealing member without destroying the container, the sealing member is formed as a brittle member, which is, for example, glass.

Since the gas adsorbing member is sealed inside the outer package, the sealing member may be destroyed when the gas adsorbing device is present in the atmosphere. Accordingly, if it is difficult to apply force to the container after the gas adsorbing device is set in a product, then force may be applied to the container over the packaging member in the atmosphere to deform and destroy the sealing member, and thereafter the gas adsorbing device may be set in the product. Such a method of forming the opening of the gas adsorbing member is applicable not only to a product formed of a soft material, such as a vacuum insulation panel, but also to a product that is not externally deformed easily.

INDUSTRIAL APPLICABILITY

The gas adsorbing device according to the present invention is useful particularly in cases where it is necessary to maintain a vacuum state for a long period of time and necessary to adsorb air that contains steam, for example, a case where the gas adsorbing device is applied to a vacuum insulation panel.

REFERENCE SIGNS LIST 1 gas adsorbing device
2 gas adsorbing member
3 moisture adsorbent
4 outer package
5 container
6 gas adsorbent
7 sealing member
8 through-hole
9 packaging member
20 protrusion
21 outer skin member
100 vacuum insulation panel (hollow body)
200 refrigerator

The invention claimed is:

1. A gas adsorbing device comprising:
   a gas adsorbing member including a container with an opening, a gas adsorbent housed in the container, and a sealing member sealing the opening;
   a moisture adsorbent; and
   an outer package whose inside is decompressed, the outer package housing the gas adsorbing member and the moisture adsorbent, wherein
   the gas adsorbing member and the moisture adsorbent are arranged inside the outer package, such that an end portion of the gas adsorbing member in its longitudinal direction and an end portion of the moisture adsorbent in its longitudinal direction are adjacent to each other.

2. The gas adsorbing device according to claim 1, wherein a communication part is formed in the outer package at a portion that is in contact with the moisture adsorbent, the communication part allowing the inside of the outer package to be in communication with outside.

3. The gas adsorbing device according to claim 1, wherein the sealing member is a brittle member.

4. The gas adsorbing device according to claim 1, wherein the moisture adsorbent is housed in a packaging member having air permeability.

5. The gas adsorbing device according to claim 4, wherein at least part of the packaging member and at least part of the outer package are in close contact with each other at their surfaces.

6. The gas adsorbing device according to claim 4, wherein at least part of the packaging member and at least part of the outer package are adhered to each other at their surfaces.

7. A hollow body housing the gas adsorbing device according to claim 1 in a decompressed internal space.

* * * * *